United States Patent
Verdegan et al.

(10) Patent No.: US 6,709,575 B1
(45) Date of Patent: Mar. 23, 2004

(54) EXTENDED LIFE COMBINATION FILTER

(75) Inventors: Barry M. Verdegan, Stoughton, WI (US); Peter K. Herman, Cookeville, TN (US)

(73) Assignee: Nelson Industries, Inc., Stoughton, WI (US)

(*) Notice: Subject to any disclaimer, the term of this patent is extended or adjusted under 35 U.S.C. 154(b) by 151 days.

(21) Appl. No.: 09/745,754

(22) Filed: Dec. 21, 2000

(51) Int. Cl.$^7$ .................. B01D 29/68; B01D 36/00; B04B 9/06

(52) U.S. Cl. .................. 210/108; 210/168; 210/169; 210/258; 210/259; 210/295; 210/323.1; 210/333.01; 210/360.1; 210/380.1; 210/411; 210/416.1; 210/443; 210/500.1; 123/196 A; 494/24; 494/26; 494/36; 494/49; 494/84

(58) Field of Search .................. 210/108, 167, 210/168, 258, 259, 295, 323.1, 333.01, 360.1, 380.1, 416.1, 411.443, 500.1; 123/196 A; 494/24, 26, 36, 49, 84

(56) References Cited

U.S. PATENT DOCUMENTS

| | | |
|---|---|---|
| 5,462,679 A | 10/1995 | Verdegan et al. |
| 5,575,912 A | 11/1996 | Herman et al. |
| 5,637,217 A | 6/1997 | Herman et al. |
| 5,674,392 A | 10/1997 | Christophe et al. |
| 5,707,519 A | 1/1998 | Miller et al. |
| 5,779,900 A | 7/1998 | Holm et al. |
| 5,795,477 A | 8/1998 | Herman et al. |
| 5,858,224 A | 1/1999 | Schwandt et al. |
| 5,906,733 A | 5/1999 | Purvey |
| 6,017,300 A | 1/2000 | Herman |
| 6,019,717 A | 2/2000 | Herman |
| 6,210,311 B1 * | 4/2001 | May .................. 494/49 |
| 6,273,031 B1 * | 8/2001 | Verdegan et al. ...... 123/196 A |
| 6,319,402 B1 * | 11/2001 | Schwandt et al. ...... 210/323.2 |
| 6,378,706 B1 * | 4/2002 | Verdegan et al. ...... 210/411 |

FOREIGN PATENT DOCUMENTS

| | | |
|---|---|---|
| EP | 995496 | 4/2000 |
| EP | 1008731 | 6/2000 |
| WO | 00/61923 | 10/2000 |

* cited by examiner

Primary Examiner—David A Reifsnyder

(57) ABSTRACT

A filtering system (10) is provided for filtering working fluid from a machine (12) and includes a cleanable filter (16) and a centrifuge (82) where filter capacity is too low for a permanent filter yet flow rate is too high for a centrifuge. The system transfers the contaminant storage function from the cleanable filter to the centrifuge. A simple effective centrifuge is provided.

8 Claims, 3 Drawing Sheets

FIG. 1

EXTENDED LIFE COMBINATION FILTER

BACKGROUND AND SUMMARY

The invention relates to filters, particularly extended life filters, and further particularly to combinations separating filtering and storage functions.

End users are seeking to extend the service intervals and reduce service for various machines requiring filtering of a working fluid, such as lubricating oil for internal combustion engines, hydraulic fluid for hydraulic equipment, and the like. Ultimately, the user would like to have service-free equipment. For a variety of reasons, this goal has not been attained. One of the reasons is the requirement for filters, such as lube, hydraulic and fuel filters, to be serviced periodically. In the case of conventional disposable filters, the filters do not have great enough contaminant-holding capacity to last the life of the equipment. In the case of cleanable filters, capacity is not an issue, if the filter is cleaned on a regular basis, but rather the contaminant removed from the filter must be disposed of somehow. One possible solution in an internal combustion engine is to burn the contaminant with the fuel, for example as shown in commonly owned copending U.S. application Ser. No. 09/210,363, filed Dec. 11, 1998, now U.S. Pat. No. 6,273,031, incorporated herein by reference. The present invention provides another solution.

In one aspect of the present invention, a cleanable backwashable filter, for example as shown in U.S. Pat. Nos. 5,462,679, 5,779,900, 5,858,224, and commonly owned copending U.S. application Ser. Nos. 09/210,363, filed Dec. 11, 1998, now U.S. Pat. No. 6,273,031, 09/563,737, filed May 3, 2000, now U.S. Pat. No. 6,378,706, and 09/466,388, filed Dec. 17, 1999, now U.S. Pat. No. 6,319,402 incorporated herein by reference, is provided in combination with a contaminant separator receiving and filtering the contaminant-laden working fluid backwashed from the cleanable filter. The contaminant separator separates contaminant from the working fluid, and also stores the contaminant. In one aspect, the fluid after separation of contaminant is returned to the circulation system circulating working fluid to the machine, thus providing in combination with the cleanable filter a permanent filter system, or at least a reduced-service filter system. The contaminant separator is preferably a batch processor operative during the backwash mode of the cleanable filter and receiving contaminant-laden working fluid from the cleanable filter and separating and storing contaminants, and passing working fluid.

The cleanable main filter is a continuous flow filter in the filtering mode, and, in one aspect, the batch processor contaminant separator is a noncontinuous flow centrifuge having a rotor driven during the backwash mode of the cleanable main filter, and nondriven during the filtering mode of the cleanable main filter. In a desirable aspect, when air is used as the cleansing fluid for the cleanable filter, the same source of compressed air may be used to drive a turbine on the centrifuge rotor. The backwashed contaminant-laden fluid from the cleanable filter is discharged to the centrifuge, whose rotor is preferably already spinning or rapidly speeding up, causing the fluid to form a hollow cylindrical air core due to centrifugal force, which central air core allows excess purge air to escape from the rotor even though full of purge fluid such as lubricating oil. Other sources of motive force may be used for the centrifuge, though pressurized air is preferred for simplicity if already used for backwashing the main cleanable filter.

The centrifuge is sized to hold at least one housing-full of fluid of the cleanable filter in addition to a desired quantity of packed contaminant such as sludge for intended centrifuge service intervals, i.e. a rotor that is full of separated contaminant or sludge must still have enough residual volume to hold one filter-full of fluid or oil from the main cleanable filter. Following the purge cycle of the cleanable filter, the centrifuge is driven for a sufficient length of time to separate the desired contaminants from the fluid, for example in engine oil applications, the length of such time is a function of the centrifuge geometry, speed and oil viscosity, with typically a 1 to 5 minute interval being adequate to remove particles greater than 1 micron. After this interval, the air supply to the rotor turbine is discontinued, and the rotor gradually comes to a stop. The clean separated fluid then drains out of the rotor by gravity, and preferably drains by gravity back to an engine oil sump in such application. Alternatively, the drain back to the sump can be assisted by a delayed charge of compressed air pressurizing the centrifuge housing and forcing the oil through the drain line back to the oil reservoir or sump, thus enabling use of a small diameter drain line and avoiding problems with hydraulic trap or a below-oil drain entry port on the sump.

Separated contaminants such as sludge remain in the centrifuge housing, forming a cylindrical cake, with loose or nonadhesive particles trapped preferably in a storage chamber in the rotor preferably filled with high-loft filter media preferably comprising a matrix of filter material of at least 75% void volume, preferably at least 95%. In a further aspect, this desirably reduces fluid turbulence and particle re-entrainment during the rather violent speed transients of the rotor fill/spin-up cycle.

Air backwashing of the cleanable filter should be done at least every time the oil is changed, but the more frequently it is done the better. Ideally, the entire process is automated and is done whenever the equipment is shut down for service, for example to refuel. In a further aspect, the cleaned and separated oil from the centrifuge can instead be returned to another tank or location, such as the fuel tank for burning with the fuel, as above noted.

While it is preferred that the noted storage container of the centrifuge be sized large enough to hold all of the contaminant that will be removed by the cleanable filter during the life of the equipment, this is not always feasible. In such cases, the centrifuge storage container is an easily removed and replaced modular component, facilitating easy periodic manual servicing, instead of the main filter. A disposable liner shell capsule extends along and lines the interior of the outer wall of the rotor and accumulates and contains contaminant, such that the centrifuge may be serviced by removing the outer sidewall of the rotor and then discarding the disposable liner shell capsule with contained contaminant therein and replacing same with another disposable liner shell capsule.

In a further aspect, a single centrifuge services multiple filters. Backwashable cleanable filters are connected in parallel to the centrifuge. The filters are cleaned sequentially, and the centrifuge is operated in sequential batch processing modes, one for each filter. Alternatively, if the storage capability of the centrifuge is large enough, it may handle the combined volumes of the filters at the same time.

In a desirable aspect, the invention provides a filtering system combining a cleanable filter and a centrifuge and transferring a contaminant storage function from the cleanable filter to the centrifuge.

In a further aspect, the invention provides a filtering system for filtering working fluid from a machine where filter capacity is too low for a permanent filter yet flow rate is too high for a centrifuge. The combination employs the flow rate capability of a filter with the storage capacity capability of a centrifuge.

In a further aspect, a simple effective centrifuge is provided.

DETAILED DESCRIPTION OF THE INVENTION

Figure 1:
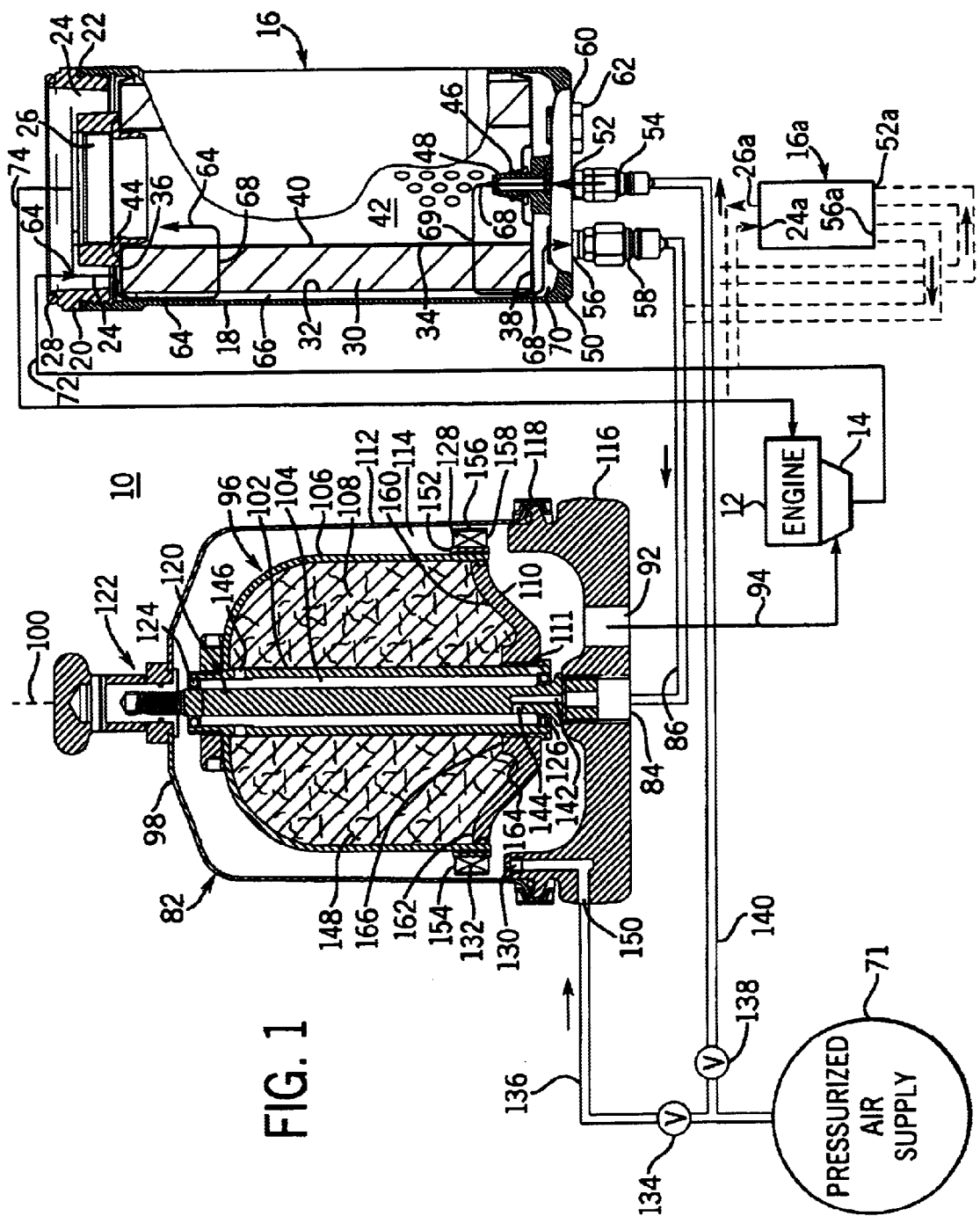
FIG. 1 shows a filtering system in accordance with the invention.

FIG. 1 shows a filtering system 10 for filtering working fluid, such as lubricating oil, from a machine 12, such as an internal combustion engine having an oil sump 14. The system includes a cleanable backflushable filter 16, such as shown in U.S. Pat. Nos. 5,462,679, 5,779,900, 5,858,224, incorporated herein by reference. Filter 16 includes an open-topped cylindrical cannister 18 closed by threaded adapter plate 20 in sealing relation at O-ring 22. Adapter plate 20 has a plurality of circumferentially spaced openings 24 providing inlets for receiving fluid from machine 12, for example engine oil, and has an outlet 26 for returning the fluid to the machine. Outlet 26 is internally threaded for mounting to a mounting boss of an internal combustion engine as is standard. The filter housing at adapter plate 20 is mounted to the engine block in sealing relation at O-ring 28. Mounted within the housing is a filter element 30 provided by pleated filter media having an upstream dirty side 32 and a downstream clean side 34 and filtering fluid passing therethrough from upstream side 32 to downstream side 34 as is standard. The pleated filter media is potted between end caps 36 and 38, and includes an inner perforated metal liner 40 engaging and supporting the inner pleat tips and defining hollow interior 42 of the filter. Upper end cap 36 is sealed to the adapter plate outlet at gasket 44. Lower end cap 38 is sealed at grommet 46 to a central upstanding stud portion 48 extending axially from lower end 50 of the housing. The filter housing has a central lower threaded inlet 52 receiving air inlet valve 54 in threaded relation, and has a lower threaded outlet 56 receiving drain valve 58 in threaded relation, all as in noted incorporated U.S. Pat. No. 5,779,900. The filter housing may have a lower threaded opening 60 receiving a pressure sensor 62, as in noted incorporated U.S. Pat. No. 5,858,224.

As noted in the incorporated '900 patent, the filter housing has a first flowpath therethrough as shown at arrows 64 from inlets 24 then flowing downwardly through outer annular passage 66 then flowing radially inwardly through pleated filter element 30 then flowing axially upwardly through outlet 26. The filter housing has a second flowpath therethrough as shown at arrows 68 flowing from inlet 52 axially upwardly into hollow interior 42 then radially outwardly and then downwardly through outer annular passage 66 to lower collection chamber 70 to outlet 56 and through drain valve 58. During normal filtering operation during running of the engine, lubricating oil flows along the noted first flowpath 64 and is filtered and returned to the engine. With the engine off, a cleaning cycle can be initiated by introducing a cleansing fluid such as air at air inlet valve 54 from a pressurized air supply 71, such that air flows along the noted second flowpath 68 to backflush and clean pleated filter element 30, with the air and backflushed contaminant-laden working fluid discharged at outlet 56, all as in the noted incorporated patents. Clean side 34 of filter media element 30 communicates with outlet 26 and inlet 52. Dirty side 32 of filter media element communicates with inlet 24 and outlet 56. The filter has the noted flowpath 64 therethrough from inlet 24 through filter media element 30 in one direction to outlet 26. The filter has the noted flowpath 68 therethrough from inlet 52 through filter media element 30 in the opposite direction to outlet 56. Flowpaths 64 and 68 have common but opposite direction portions 65 and 69, respectively, through filter media element 30. In the filtering mode of operation of filter 16, valves 54 and 58 are closed, and fluid flows through the filter along the noted flowpath 64. The filter has a backwash mode of operation with valves 54 and 58 open, and cleaning fluid flowing through the filter along flowpath 68 and backwashing contaminant-laden working fluid from dirty side 32 of filter media element 30 to outlet 56. As noted in commonly owned copending allowed U.S. application Ser. No. 09/210,363, filed Dec. 11, 1998, now U.S. Pat. No. 6,273,031, valves may be provided in oil lines 72 and 74 to and from the filter, respectively, which valves may be closed during the noted backwash mode of operation, if desired.

A contaminant separator 82 has an inlet 84 connected by conduit 86 to drain valve 58 at outlet 56 of filter 16, such that contaminant separator 82 receives and filters contaminant-laden working fluid backflushed from filter 16. In preferred form, contaminant separator 82 is a centrifuge similar to that shown in U.S. Pat. Nos. 5,575,912, 5,637,217, 5,795,477, 6,017,300, 6,019,717, incorporated herein by reference, but modified as described below. Centrifuge 82 separates contaminant from working fluid and stores the contaminant, and has an outlet 92 discharging the working fluid after separation of contaminant. It is preferred that outlet 92 discharge working fluid at oil return line 94 to engine sump 14, to thus be returned to the circulation system circulating oil to engine 12 via oil supply and return lines 72 and 74. Centrifuge 82 is preferably a batch processor operative during the backwash mode of filter 16 and receiving contaminant-laden working fluid from outlet 56 and separating and storing contaminants, and passing working fluid via outlet 92 and line 94 back to oil sump 14.

Centrifuge 82 includes a housing 98 having rotor 96 mounted therein for rotation about axis 100. Rotor 96 has an inner cylindrical sidewall 102 with a hollow interior 104, and an outer cylindrical sidewall 106 spaced radially outwardly of inner cylindrical sidewall 102 and defining an annular space 108 therebetween. The rotor has a base plate 110 extending between inner and outer cylindrical sidewalls 102 and 106. Outer cylindrical sidewall 106 is preferably a bell-shaped member closed at its open end by base plate 110. Rotor base plate 110 has a drain passage 111, preferably at the interface with inner cylindrical sidewall 102, as in incorporated U.S. Pat. No. 6,019,717 at 65, communicating with annular space 108 and effective upon stopping of rotation of the rotor to drain fluid from annular space 108. Housing 98 has a cylindrical sidewall 112 spaced radially outwardly of rotor outer cylindrical sidewall 106 and defining annular space 114 therebetween. The housing has a base plate 116 mounted and sealed to housing sidewall 112 at clamp band 118, as in the noted incorporated '717 patent.

Housing sidewall 112 is preferably a bell-shaped member closed at its open end by base plate 116. A central stationary shaft 120 is threadingly mounted at its lower end to housing base plate 116 and extends axially upwardly within hollow interior 104 into stationary upper cap handle assembly 122, for which further reference may be had to the incorporated '717 patent showing shaft 23 extending upwardly into upper external stationary cap assembly 51 in FIGS. 1 and 3. Rotor 96 rotates about stationary shaft 120 at upper and lower roller bearings 124 and 126, comparably to roller bearings 34 and 35 in the incorporated '717 patent. Housing sidewall 112, base plate 116, upper cap assembly 122, and central shaft 120 are stationary, and rotor 96 rotates within the housing about shaft 120, all as in the noted incorporated patents.

Rotor 96 has a turbine 128 for causing rotation of the rotor in response to a pressurized gas jet motive force provided by one or more gas jets 130 directing pressurized air jets at turbine vanes 132, for which further reference may be had to FIGS. 9–11 of the incorporated '717 patent showing gas jets 165 directing pressurized air at turbine vanes 161. Valve 134 controls the supply of pressurized air through air conduit 136 to gas jet 130. Valve 138 controls the supply of pressurized air through air conduit 140 to valve 54 at inlet 52 of filter 16. Alternatively, a single valve may replace valves 134 and 138.

Backwashed contaminant-laden fluid from filter 16 is supplied through conduit 86 to centrifuge inlet 84 and passes upwardly through central axial passage 142 of shaft 120 then radially through passage 144 into hollow interior 104 of inner cylindrical sidewall 102 then axially upwardly through hollow interior 104 along the exterior of shaft 120 then radially outwardly through a plurality of apertures 146 through inner cylindrical sidewall 102 providing transfer passages for communication of hollow interior 104 with annular space 108 providing centrifugal separation upon rotation. In a desirable aspect, both the motive force for rotating the centrifuge and the cleaning fluid for filter 16 are each provided by pressurized air. Preferably, the same pressurized air supply 71 supplies both the motive force for rotation of rotor 96 and the cleaning fluid for filter 16. Valves 134 and 138 are operated such that rotor 96 begins spinning prior to introduction of contaminant-laden working fluid to inlet 84 of centrifuge 82 such that the centrifugal force of the already spinning rotor creates a hollow central air core in the contaminant-laden working fluid in hollow interior 104, allowing escape of air. A singular valve may replace valves 134 and 138 because the rotor typically begins spinning very rapidly and will already be spinning when the contaminant-laden fluid from filter 16 reaches centrifuge inlet 84.

Annular chamber 108 in rotor 96 provides a storage container storing separated contaminant, and includes a filter media element 148 reducing fluid turbulence particularly during rotor speed gradients at start-up and trapping contaminant particles and reducing particle re-entrainment during such rotor speed gradients. Filter media element 148 is a matrix of high-loft filter material of at least 75% void volume, and further preferably at least 95% void volume. The matrix of filter material of high-loft filter media 148 is preferably selected from the group consisting of: fibrous material; polyester; foam, including reticulated foam; spun-bonded web; wire mesh, including stainless steel; and sintered material, including porous ceramics. The centrifuge has a minimum capacity in annular chamber 108 equal to the capacity of stored contaminant plus the capacity of filter 16.

Filtering system 10 is desirable for filtering working fluid from a machine 12 where the filter capacity is too low for a permanent filter yet flow rate is too high for a centrifuge. Filtering system 10 provides a combination employing the flow rate capability of a filter such as 16 with the storage capacity capability of a centrifuge. The system provides a cleanable filter 16 in combination with a centrifuge 82. The centrifuge has a batch processing mode operative during the backwashing mode of cleanable filter 16 and receiving contaminant-laden working fluid from outlet 56 of cleanable filter 16 and separating and storing contaminant. As above noted, cleanable filter 16 is a continuous flow filter in the filtering mode. Centrifuge 82 is a non-continuous flow batch processor having rotor 96 driven during the backwash mode of cleanable filter 16 and separating contaminant. Rotor 96 is nondriven during the filtering mode of cleanable filter 16.

In a further embodiment, a plurality of cleanable filters 16, 16a, etc. are provided, each having respective first inlets 24, 24a, etc., first outlets 26, 26a, etc., second inlets 52, 52a, etc., and second outlets 56, 56a, etc. Second outlets 56, 56a, etc. of the plurality of cleanable filters 16, 16a, etc. are connected in parallel to inlet 84 of centrifuge 82. The centrifuge has a plurality of batch processing modes operated serially sequentially, one for each cleanable filter 16, 16a, etc. Alternatively, if the storage capability of the centrifuge is large enough, it may handle the combined volumes of the filters 16, 16a, etc. at the same time.

Filtering system 10 combines a cleanable filter 16 and a centrifuge 82 and transfers a contaminant storage function from the cleanable filter to the centrifuge. Rotor base plate 110 has drain passage 111 communicating with annular space 108 and effective upon stopping of rotation to drain fluid therefrom. Preferably, drain passage 111 is between rotor base plate 110 and shaft 120, as in the incorporated '717 patent at 65. Centrifuge 82 is a batch processor performing the noted separating function during rotation of rotor 96 and performing the draining function after rotation of the rotor when the rotor is stopped. Annular space 108 provides the noted storage container storing separated contaminant and retaining the contaminant in high-loft filter media 148. The high-loft filter media retains and stores the separated contaminant in annular space 108 when rotor 96 is stopped. Furthermore, as above noted, high-loft filter media 148 reduces re-entrainment of separated contaminant during start-up at the beginning of the next rotation of the rotor.

Centrifuge housing 98 has inlets 84 and 150, and an outlet 92. Inlet 84 is a fluid inlet admitting contaminant-laden fluid for centrifugal separation of the contaminant upon rotation of rotor 96. Inlet 150 is a gas inlet admitting pressurized motive force gas to cause rotation of rotor 96. Outlet 92 is both a gas and fluid outlet exhausting both the noted fluid after separation and the noted motive force gas after driving rotor 96. Port 84 in housing base plate 116 communicates with hollow interior 104 and provides the noted fluid inlet for admitting contaminant-laden fluid from outlet 56 of cleanable filter 16 to hollow interior 104 of rotor inner cylindrical sidewall 102 for passing through transfer passages 146 into annular space 108 for centrifuge separation upon rotation. Port 92 in housing base plate 116 communicates with drain passage 111 and with annular space 114 and provides the noted outlet exhausting fluid from annular space 108 through drain passage 111 and exhausting gas from annular space 114. Port 150 communicates with annular space 114 at turbine 128 for admitting pressurized gas for rotating rotor 96. As above noted, it is preferred that the cleansing fluid is air, and that the contaminant-laden fluid contains both liquid and air, and that the noted motive force pressurized gas is air. In a further embodiment, the housing may include an air vent as shown in the incorporated '717 patent at 152, 150, FIG. 6.

It is preferred that the fluid be drained from outlet 92 of centrifuge filter 82 by gravity drain. In an alternate embodiment, the fluid may be discharged from outlet 92 to the noted circulation system by a delayed charge of pressurized air from the source of compressed air 71 pressurizing the centrifuge following separation. It is preferred that the supply of pressurized air from source 71 to inlet 52 of filter 16 and to inlet 150 of centrifuge 82 be controlled, as above noted, such that rotor 96 begins spinning prior to introduction of contaminant-laden working fluid to inlet 84 of the centrifuge such that the centrifugal force of the already spinning rotor creates a hollow central air core in the contaminant-laden working fluid in hollow interior 104 allowing escape of air.

Turbine 128 has an inner ring 152 on outer cylindrical sidewall 106 of rotor 96, and a plurality of vanes 132 extending outwardly to outer vane tips 154, for which further reference may be had to the noted incorporated '717 patent, FIGS. 9–11. Turbine 128 also has an outer ring 156 at outer vane tips 154, which outer ring blocks and contains deflected radially outward gas flow from the vanes and confines the deflected gas flow to the radial gap 158 between inner and outer rings 152 and 156. Turbine 128 is in annular space 114.

Rotor base plate 110 has a configured surface 160 facing annular space 108 and gravitationally guiding drainage of fluid therefrom to drain passage 111 upon stopping of rotation. Configured surface 160 has an upper-height outer portion 162 adjacent outer cylindrical rotor sidewall 106, a lower pocket portion 164, and an intermediate-height inner portion 166 adjacent inner cylindrical rotor sidewall 102. Configured surface 160 is tapered radially inwardly and downwardly from upper-height outer portion 162 to lower pocket portion 164 and then upwardly to intermediate-height inner portion 166. Upper-height outer portion 162 has a height higher than intermediate-height inner portion 166. Intermediate-height inner portion 166 has a height greater than lower pocket portion 164. Drain passage 111 is at intermediate-height inner portion 166 such that separated contaminant not retained by high-loft filter media 148 is collected in lower pocket portion 164, and the fluid above such collected contaminant in lower pocket portion 164 drains to drain passage 111.

Figure 2:
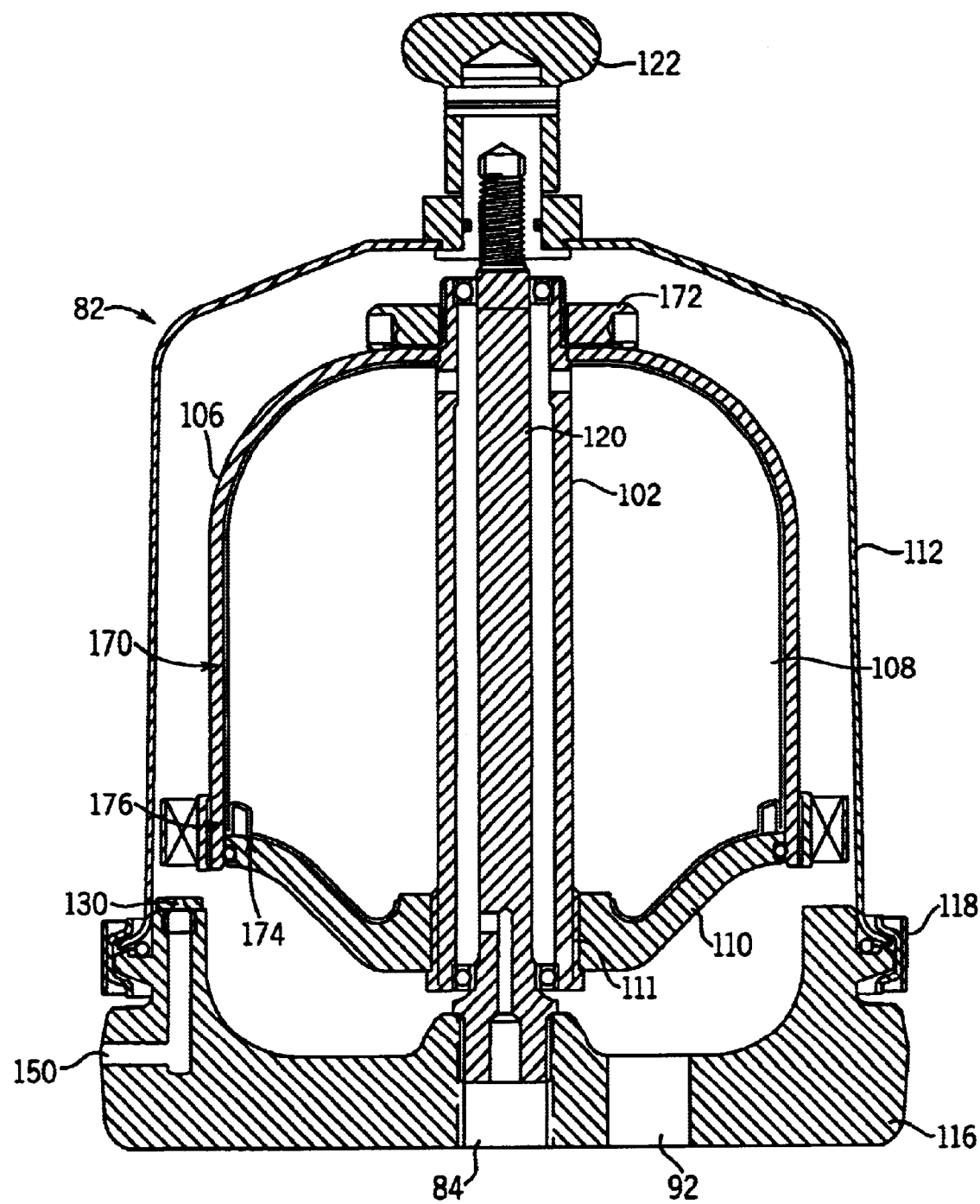
FIG. 2 shows a further embodiment of a portion of the system of FIG. 1.

FIG. 2 shows a further embodiment of the centrifuge of FIG. 1 and uses like reference numerals from above where appropriate to facilitate understanding. Rotor outer cylindrical sidewall 112 is removably separable from base plate 110, for which further reference may be had to incorporated U.S. Pat. Nos. 5,637,217 and 6,019,717. As noted in the incorporated '217 patent, upon release of clamp band 118, outer housing sidewall 112 and handle 122 can be unscrewed as a connected subassembly from central stationary shaft 120, as noted in the incorporated '217 patent, column 13, lines 59+. Securing nut 172 is then unthreaded from inner cylindrical sidewall 102, to in turn permit removal of rotor outer cylindrical sidewall 106. Disposable liner shell capsule 170 with contained contaminant therein is then removed and discarded, and replaced by another disposable liner shell capsule. Liner shell capsule 170 may further include a base portion 174 extending along and lining the interior of rotor base plate 110. Drain passage 111 is uncovered by base portion 174 of the liner shell capsule. Base portion 174 is tack welded to liner shell capsule 170 at 176. Rotor outer cylindrical sidewall 106 is a bell-shaped member, and liner shell 170 is complementally bell-shaped along the interior thereof. Disposable liner shell capsule 170 defines the noted annular space 108 therein. In preferred form, the noted high-loft filter media 148 is contained in annular space 108 in liner shell capsule 170. Disposable liner shell capsule 170 with the noted high-loft filter media 148 therein is discarded upon servicing of the centrifuge, and replaced by another disposable liner shell capsule with fresh high-loft filter media therein.

The preferred system and method utilizes the flow rate capability of a filter such as 16 and the storage capacity capability of a centrifuge in a combination filtering system 10 for filtering working fluid from a machine 12 where filter capacity is too low for a permanent filter yet flow rate is too high for a centrifuge.

Figure 3:
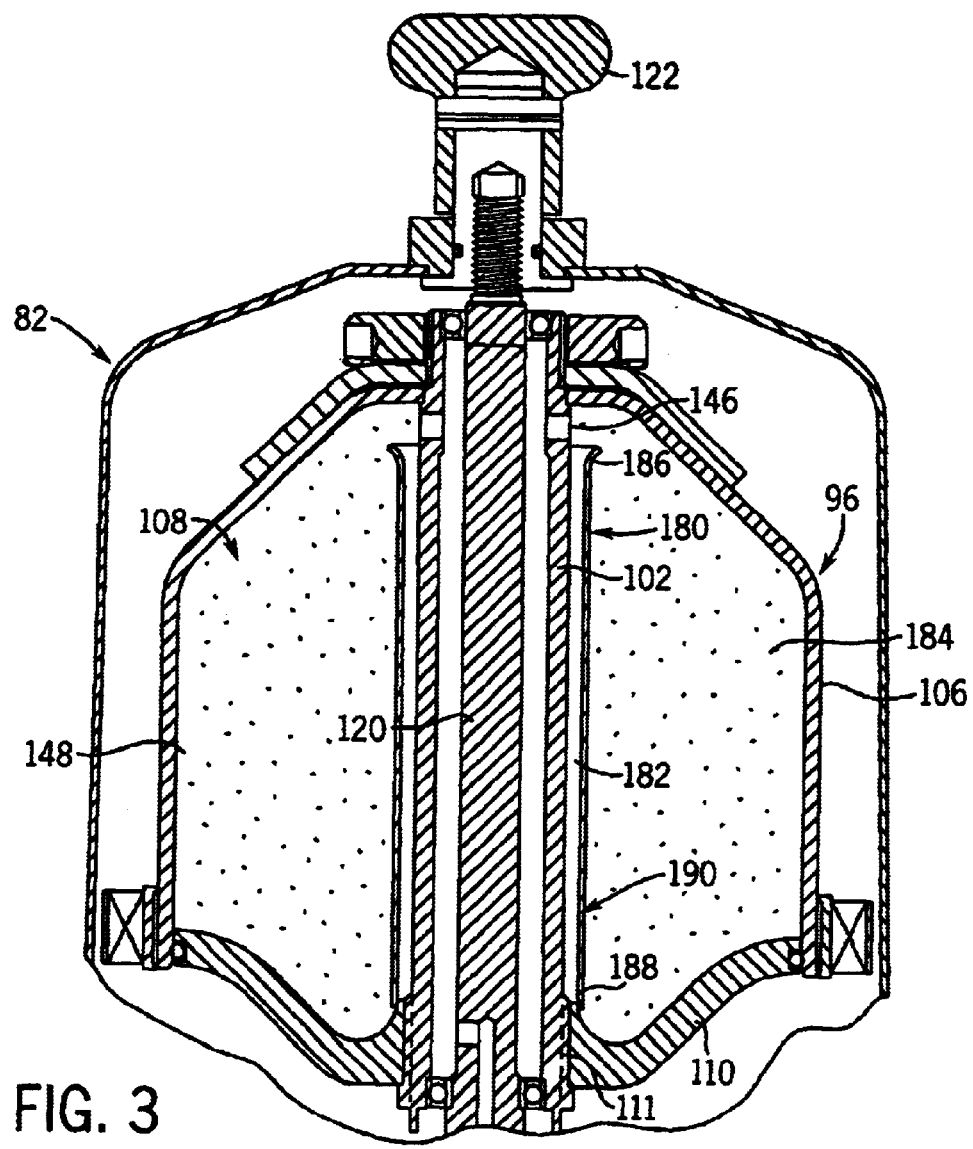
FIG. 3 is like a portion of FIG. 2 and shows a further embodiment.
Figure 4:
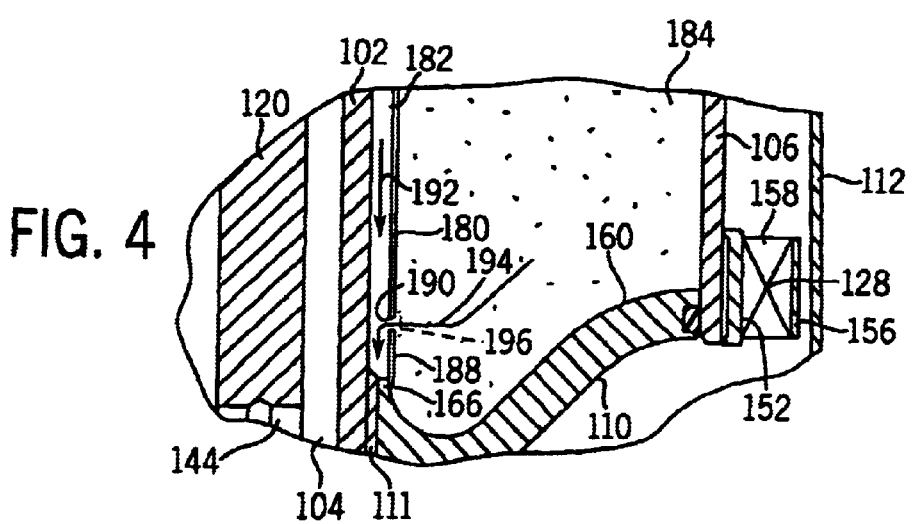
FIG. 4 is an enlarged view of a portion of FIG. 3.

FIGS. 3 and 4 show a further embodiment and use like reference numerals from above where appropriate to facilitate understanding. The centrifuge in FIGS. 3 and 4 is desirable for reducing particle re-entrainment in the filter system of FIG. 1 after the noted separation of particulate contaminant from a contaminant-laden liquid, such as dirty lube oil, in a gas stream, such as air. A standpipe 180 circumscribes rotor inner cylindrical sidewall 102 and divides annular space 108 into an inner annular chamber 182 between standpipe 180 and inner cylindrical sidewall 102, and an outer annular chamber 184 between standpipe 180 and outer cylindrical sidewall 106. Standpipe 180 has an upper flared end 186 at and slightly below transfer passage 146, and has a lower end 188 at drain passage 111. During rotation of the rotor, air from transfer passage 146 is vented downwardly through inner annular chamber 182 to drain passage 111, and contaminant-laden liquid from transfer passage 146 is centrifically propelled into outer annular chamber 184. Standpipe 180 has one or more holes or openings 190 at lower end 188 draining liquid therethrough from outer annular chamber 184 to drain passage 111 upon stopping of rotation of the rotor. In FIG. 4, the air vent is shown at arrow 192, and the liquid drain is shown at arrow 194.

Standpipe 180 serves a dual purpose. Firstly, it reduces the liquid drain-out rate at 194 after the rotor stops spinning following the purge cycle of cleanable filter 16, thereby reducing the amount of particles carried out with the draining liquid. Secondly, the standpipe provides an annular zone at 182 adjacent the rotor hub or inner cylindrical sidewall 102 that is free of high-loft filter media 148, to allow a high volumetric flow of purge air at 192 to escape from the rotor quickly and with low pressure drop. Following purge of cleanable filter 16 and spin-down of centrifuge rotor 96, separated collected contaminant particles may be re-entrained during the rotor drain-out stage as liquid drains from the rotor. This re-entrainment of collected particles may be reduced by slowing down the drainage rate of liquid from the rotor. This in turn could be achieved by simply reducing the size of drainage passage 111, however the trade-off is that the high volumetric flowrate of air during the purge cycle would be throttled by such reduced size rotor drain passage, and hence is not desirable. Standpipe 180 with small drain holes 190 near its bottom end 188 meets the noted dual objective of slow liquid drain rate after rotation has stopped, yet high air-flow capability for air venting during rotation. Another benefit provided by standpipe 180 is the creation of an annular zone at inner annular chamber 182 that is completely free of high-loft media 148, thus allowing the air an unrestricted escape passage and minimizing high velocity air flow through wetted media 148 in annular space 108. In a further alternative, standpipe 180 is perforated with a plurality of holes at lower end 188 and covered with a ring of filter material as shown in FIG. 4 at dashed line 196, for example woven mesh media or the like, to similarly reduce the drainage rate and provide a final filter to reduce outflow of particulates. Standpipe 180 at lower end 188 is preferably mounted by welding or the like to rotor base plate 110 at configured surface 160, preferably around inner portion 166.

It is recognized that various equivalents, alternatives and modifications are possible within the scope of the appended claims.

What is claimed is:

1. A filtering system for filtering working fluid from a machine, said system combining a cleanable filter and a centrifuge and transferring a contaminant storage function from said cleanable filter to said centrifuge, said cleanable filter having a filter media element for filtering said working fluid, said cleanable filter having a first inlet receiving working fluid from said machine, said cleanable filter having a first outlet returning working fluid to said machine, said cleanable filter having a second inlet receiving a cleaning fluid from a source of cleaning fluid, said cleanable filter having a second outlet exhausting said cleaning fluid, said filter media element having a clean side communicating with said first outlet and said second inlet, said filter media element having a dirty side communicating with said first inlet and said second outlet, said cleanable filter having a first flowpath therethrough from said first inlet through said filter media element in one direction to said first outlet, said cleanable filter having a second flowpath therethrough from said second inlet through said filter media element in the opposite direction to said second outlet, said first and second flowpaths having common but opposite direction portions through said filter media element, said cleanable filter having a filtering mode of operation with said second inlet closed and said second outlet closed and filtering fluid flow therethrough along said first flowpath, said cleanable filter having a backwash mode of operation with said second inlet open and said second outlet open and cleaning fluid flowing therethrough along said second flowpath and backwashing contaminant-laden working fluid from said dirty side of said filter media element to said second outlet, said centrifuge having an inlet connected to said second outlet of said cleanable filter and receiving contaminant-laden working fluid therefrom and separating and storing contaminant, said centrifuge comprising a housing having a rotor mounted for rotation therein about an axis, said rotor having an inner cylindrical sidewall with a hollow interior, and an outer cylindrical sidewall spaced radially outwardly of said inner cylindrical sidewall and defining an annular space therebetween, said inner cylindrical sidewall having a transfer passage therethrough providing communication of said hollow interior with said annular space, said housing having an inlet for admitting contaminant-laden fluid to said hollow interior of said inner cylindrical sidewall for passing through said transfer passage into said annular space for centrifugal separation upon said rotation, said annular space providing a storage container storing said contaminant, a standpipe circumscribing said inner cylindrical sidewall and dividing said annular space into an inner annular chamber between said standpipe and said inner cylindrical sidewall, and an outer annular chamber between said standpipe and said outer cylindrical sidewall, wherein said rotor has a base plate extending between said inner and outer cylindrical sidewalls, said rotor base plate has a drain passage communicating with said annular space and effective upon stopping of said rotation to drain fluid therefrom, said standpipe has an upper end at said transfer passage, and has a lower end at said drain passage, and wherein said contaminant-laden fluid comprises contaminant-laden liquid in a gas stream, and such that during rotation, gas in said gas stream from said transfer passage is vented through said inner annular chamber to said drain passage, and contaminant-laden liquid from said transfer passage is centrifugally propelled into said outer annular chamber.

2. The invention according to claim 1 comprising high-loft filter media in said outer annular chamber comprising a matrix of filter material of at least 75% void volume, said outer annular chamber providing a storage container storing said contaminant and retaining said contaminant in said high-loft filter media, said high-loft filter media retaining and storing said separated contaminant in said outer annular chamber, including after said rotation when said rotor is stopped, said high-loft filter media reducing re-entrainment of said separated contaminant during start-up at the beginning of the next rotation of said rotor.

3. The invention according to claim 1 wherein said rotor outer cylindrical sidewall is removably separable from said base, and wherein said rotor further comprises a disposable liner shell capsule extending along and lining the interior of said outer cylindrical sidewall and accumulating and containing contaminant, such that said centrifuge may be serviced by removing said outer cylindrical sidewall and discarding said disposable liner shell capsule with contained contaminant therein and replacing same with another disposable liner shell capsule.

4. The invention according to claim 1 wherein said standpipe has an upper reach at said upper end at a level vertically below said transfer passage.

5. The invention according to claim 4 wherein said standpipe has one or more openings at said lower end draining fluid therethrough from said outer annular chamber to said drain passage upon said stopping of said rotation, wherein said rotor has a base plate extending between said inner and outer cylindrical sidewalls, said rotor base plate has a configured surface facing said annular space and gravitationally guiding drainage of liquid therefrom to said drain passage upon said stopping of rotation, and wherein said standpipe at said lower end is mounted to said rotor base plate at said configured surface, and wherein said configured surface has an upper-height outer portion adjacent said outer cylindrical sidewall, a lower pocket portion, and an intermediate-height inner portion adjacent said inner cylindrical sidewall, said configured surface being tapered radially inwardly and downwardly from said upper-height outer portion to said lower pocket portion and then upwardly to said intermediate-height inner portion, said upper-height outer portion having a height higher than said intermediate-height inner portion, said intermediate-height inner portion having a height higher than said lower pocket portion, said drain passage being at said intermediate-height inner portion, such that separated contaminant is collected in said lower pocket portion, said liquid above said collected contaminant in said lower pocket portion drains to said drain passage.

6. A filtering system for filtering working fluid from a machine comprising a filter having a filter media element for filtering said working fluid, said filter having a first inlet receiving working fluid from said machine, said filter having a first outlet returning working fluid to said machine, said filter having a second inlet receiving a cleaning fluid from a source of cleaning fluid, said filter having a second outlet exhausting said cleaning fluid, said filter media element having a clean side communicating with said first outlet and said second inlet, said filter media element having a dirty side communicating with said first inlet and said second outlet, said filter having a first flowpath therethrough from said first inlet through said filter media element in one direction to said first outlet, said filter having a second flowpath therethrough from said second inlet through said filter media element in the opposite direction to said second outlet, said first and second flowpaths having common but opposite direction portions through said filter media element, said filter having a filtering mode of operation with said second inlet closed and said second outlet closed and filtering fluid flow therethrough along said first flowpath, said filter having a backwash mode of operation with said second inlet open and said second outlet open and said cleaning fluid flowing therethrough along said second flowpath and backwashing contaminant-laden working fluid from said dirty side of said filter media element to said second outlet, a contaminant separator having an inlet connected to said second outlet of said filter and receiving and separating contaminant from said contaminant-laden working fluid, wherein said contaminant separator comprises a centrifuge having a rotor separating contaminant from working fluid, and a storage container storing said contaminant, wherein said rotor is driven to rotate by a motive force, and wherein said motive force and said cleaning fluid are each provided by pressurized fluid, namely pressurized drive fluid for said motive force, and pressurized backflushing fluid for said cleaning fluid, wherein backflushing pressure is applied by pressurized backflushing fluid from said second inlet, and wherein said motive force is applied by pressurized drive fluid externally of said rotor and externally of said storage container, wherein said drive fluid is the same as said backflushing fluid and different than said working fluid.

7. A filtering system for filtering working fluid from a machine comprising a filter having a filter media element for filtering said working fluid, said filter having a first inlet receiving working fluid from said machine, said filter having a first outlet returning working fluid to said machine, said filter having a second inlet receiving a cleaning fluid from a source of cleaning fluid, said filter having a second outlet exhausting said cleaning fluid, said filter media element having a clean side communicating with said first outlet and said second inlet, said filter media element having a dirty side communicating with said first inlet and said second outlet, said filter having a first flowpath therethrough from said first inlet through said filter media element in one direction to said first outlet, said filter having a second flowpath therethrough from said second inlet through said filter media element in the opposite direction to said second outlet, said first and second flowpaths having common but opposite direction portions through said filter media element, said filter having a filtering mode of operation with said second inlet closed and said second outlet closed and filtering fluid flow therethrough along said first flowpath, said filter having a backwash mode of operation with said second inlet open and said second outlet open and said cleaning fluid flowing therethrough along said second flowpath and backwashing contaminant-laden working fluid from said dirty side of said filter media element to said second outlet, a contaminant separator having an inlet connected to said second outlet of said filter and receiving and separating contaminant from said contaminant-laden working fluid, wherein said contaminant separator comprises a centrifuge having a rotor separating contaminant from working fluid, and a storage container storing said contaminant, wherein said rotor is driven to rotate by a motive force, and wherein said motive force and said cleaning fluid are each provided by pressurized fluid, namely pressurized drive fluid for said motive force, and pressurized backflushing fluid for said cleaning fluid, wherein backflushing pressure is applied by pressurized backflushing fluid from said second inlet, and wherein said motive force is applied by pressurized drive fluid externally of said rotor and externally of said storage container, wherein said rotor has an inner cylindrical sidewall, and an outer cylindrical sidewall spaced radially outwardly of said inner cylindrical sidewall, and comprising an annular space between said inner and outer cylindrical sidewalls and providing said storage container, and comprising a turbine on said outer cylindrical sidewall and external of said annular space for causing rotation of said rotor in response to impingement of said pressurized drive fluid against said turbine.

8. A filtering system for filtering working fluid from a machine comprising a filter having a filter media element for filtering said working fluid, said filter having a first inlet receiving working fluid from said machine, said filter having a first outlet returning working fluid to said machine, said filter having a second inlet receiving a cleaning fluid from a source of cleaning fluid, said filter having a second outlet exhausting said cleaning fluid, said filter media element having a clean side communicating with said first outlet and said second inlet, said filter media element having a dirty side communicating with said first inlet and said second outlet, said filter having a first flowpath therethrough from said first inlet through said filter media element in one direction to said first outlet, said filter having a second flowpath therethrough from said second inlet through said filter media element in the opposite direction to said second outlet, said first and second flowpaths having common but opposite direction portions through said filter media element, said filter having a filter mode of operation with said second inlet closed and said second outlet closed and filtering fluid flow therethrough along said first flowpath, said filter having a backwash mode of operation with said second inlet open and said second outlet open and said cleaning fluid flowing therethrough along said second flowpath and backwashing contaminant-laden working fluid from said dirty side of said filter media element to said second outlet, a contaminant separator having an inlet connected to said second outlet of said filter and receiving and separating contaminant from said contaminant-laden working fluid, wherein said contaminant separator comprises a centrifuge having a rotor separating contaminant from working fluid, and a storage container storing said contaminant, wherein said rotor is driven to rotate by a motive force, and wherein said motive force and said cleaning fluid are each provided by pressurized fluid, namely pressurized drive fluid for said motive force, and pressurized backflushing fluid for sais cleaning fluid, wherein backflushing pressure is applied by pressurized backflushing fluid from said second inlet, and wherein said motive force is applied by pressurized drive fluid externally of said rotor and externally of said storage container, wherein said rotor has an inner cylindrical sidewall, and an outer cylindrical sidewall spaced radially outwardly of said inner cylindrical sidewall, and comprising an annular space between said inner and outer cylindrical sidewalls and providing said storage container, and comprising a turbine on said rotor and external of said annular space for causing rotation of said rotor in response to impingement of said pressurized drive fluid against said turbine, comprising high-loft filter media in said annular space, said high-loft filter media comprising a matrix of filter material of at least 75% void volume, said matrix of filter material of said high-loft filter media being selected from the group consisting of fibrous material, polyester from including reticulated foam, spun bonded web, wire mesh including stainless steel, and sintered material including porous composites, and wherein said rotor has a base plate extending between said inner and outer cylindrical sidewalls, said rotor base plate having a drain passage communicating with said annular space and effective upon stopping of rotation of said rotor to drain fluid therefrom, said rotor base plate having a configured surface facing upwardly toward said annular space and having an upper-height outer portion adjacent said outer cylindrical sidewall, a lower pocket portion, and an intermediate-height inner portion adjacent said inner cylindrical sidewall, said configured surface being tapered radially inwardly and downwardly from said upper-height outer portion to said lower pocket portion and then upwardly to said intermediate-height inner portion, said upper-height outer portion having a height higher than said intermediate-height inner portion, said intermediate-height inner portion having a height greater than said lower pocket portion, said drain passage being at said intermediate-height inner portion, such that separated contaminant not retained by said high-loft filter media is collected in said lower pocket portion, and fluid above said collected contaminant in said lower pocket portion drains to said drain passage.

* * * * *